United States Patent [19]

Schröfelbauer et al.

[11] Patent Number: 4,509,436
[45] Date of Patent: Apr. 9, 1985

[54] METHOD OF AND APPARATUS FOR THE DESULFURIZATION OF FLUE GAS OF A COAL-FIRED COMBUSTION PROCESS

[75] Inventors: Herbert Schröfelbauer; Josef Kakl, both of Klagenfurt; Gernot Staudinger, Graz; Hermann Filipot, Villach, all of Austria

[73] Assignee: Österreichische Draukraftwerke Aktiengesellschaft, Klagenfurt, Austria

[21] Appl. No.: 537,651

[22] Filed: Sep. 30, 1983

[30] Foreign Application Priority Data

Sep. 30, 1982 [AT] Austria .................................. 3632/82

[51] Int. Cl.³ .............................................. F23J 11/00
[52] U.S. Cl. .................................. 110/345; 110/204; 110/216; 110/263; 110/347
[58] Field of Search .............. 110/203, 204, 205, 207, 110/215, 216, 233, 234, 263, 303, 342, 343, 344, 345, 347, 245; 431/4, 5, 7, 10

[56] References Cited

U.S. PATENT DOCUMENTS

| 3,675,600 | 7/1972 | Jones ................... | 110/203 |
| 3,927,627 | 12/1975 | Brunn .................. | 110/342 |
| 4,182,274 | 1/1980 | Williams ............... | 110/204 |
| 4,262,610 | 4/1981 | Hein et al. ............ | 110/342 |
| 4,270,467 | 6/1981 | Drake .................. | 110/216 |
| 4,272,496 | 6/1981 | Powell ................. | 110/343 |
| 4,312,280 | 1/1982 | Shearer et al. ........ | 110/263 |

Primary Examiner—Edward G. Favors
Assistant Examiner—Steven E. Warner
Attorney, Agent, or Firm—Karl F. Ross; Herbert Dubno

[57] ABSTRACT

Flue gas from a coal-fired combustion to which a dry sulfur-binding additive is supplied, after cooling is subjected to filtration to remove additive ash therefrom. According to the invention, cooled additive ash is fed to at least a portion of the flue gas to reduce the temperature thereof approximately to the water dewpoint, thereby promoting the sulfur-binding reaction.

13 Claims, 4 Drawing Figures

METHOD OF AND APPARATUS FOR THE DESULFURIZATION OF FLUE GAS OF A COAL-FIRED COMBUSTION PROCESS

FIELD OF THE INVENTION

Our present invention relates to a process for the desulfurization of flue gas from a coal-fired combustion process utilizing the dry-additive technique in which the coal is burned in the presence of a sulfur-binding additive in the boiler combustion chamber and the flue gas, with partially unreacted additive material (additive ash), is discharged from the combustion chamber and subjected to filtration in which the additive ash is removed. The invention also relates to an apparatus for carrying out this method.

BACKGROUND OF THE INVENTION

In the construction and operation of large combustion installations, for example, steam-generating plants for steam turbines (e.g. in coal-fired electricity-generating power plants), increased attention is required to avoid the emission of toxic and noxious components into the atmosphere. In particular, the release of sulfur and sulfur compounds must be held as low as possible. On the other hand, for economical reasons, it is desirable to utilize in the combustion process so called low grade coal, e.g. brown coal or low-rank bituminous coal, a fuel which, upon combustion, generates large quantities of such pollutants.

The most significant pollutants are sulfur dioxide and sulfur trioxide and these, at least, must be removed to the greatest possible extent from the flue gases. It should be self-understood that the removal of sulfur and sulfur compounds requires flue gas cleaning apparatus which is expensive to install and to operate.

To reduce the emission of sulfur and sulfur compounds into the flue gas in a gaseous form, it has already been proposed to bind the sulfur from the fuel in a solid ash or particulate product. To this end, it has been proposed to introduce additives into the combustion chamber so that they will absorb, e.g. by chemical reaction, at least part of the sulfur which is liberated by the fuel combustion within this chamber.

Chemical binding agents for sulfur in this manner have hitherto included finely divided calcium oxide or calcium carbonate which were blown into the combustion chamber.

In coal-fired combustion chambers, moreover, in which the coal is subjected to a mill-drying circulation, the calcium oxide or calcium carbonate can be added to the coal before the coal enters the mill so that the milling operation blends the sulfur-binding additive with the coal.

The two components, namely the coal and the calcium compound are then introduced together through the coal-dust burner into the fire box or combustion chamber.

This dry additive technique, while successful in reducing the amount of gaseous sulfur which must be scrubbed or otherwise removed from the flue gas subsequently, does not fully satisfy all desired requirements at least in part because the type of coal used plays a significant role in the efficiency of the process. For example, it has been found that many brown coal types cannot be adequately desulfurized by the dry additive process, possibly because high combustion chamber temperatures are developed which may result in a dead burning of the calcium oxide.

It has also been suggested to introduce a coal gas to the combustion chamber, e.g. a recycled flue gas, so that its available heat state can be utilized to maintain optimum temperature conditions for the reaction of the additive with the sulfur in the flue gas. An apparatus utilizing this process is described in greater detail below.

To improve the binding of the sulfur in the additive, it has been suggested to raise the relative humidity of the flue gas before it enters the dust filter by cooling it to a lower temperature. The cooling can be effected via a heat exchanger and/or by the spraying of water into the flue gas.

The additive which has not reacted in the combustion chamber can then react in the filter unit with any remaining sulfur in the flue gas or with sulfur compounds which may remain in the flue gas to remove them.

In this connection it has been found that a corresponding cooling of the flue gas to the dewpoint and therebelow is not possible by a conventional contact cooler or by a water spray technique. In a contact cooler there is a formation of deposits upon the heat exchange surfaces which is detrimental to the process and, with a water injection process, nonevaporated water droplets collect upon the walls of the flue gas passages and apparatus. The result is a number of corrosion problems and a tendency for crusts to bake onto the surfaces, thereby leading to interruption of operations, downtime for repair and expensive maintenance procedures.

Tests with cloth filters and especially bag and tube filters for recovering the dust have shown that effective binding of the sulfur dioxide (90% and greater) can only be obtained when the temperature of the filter layer is in the region of the water dewpoint of the flue gas. Most advantageously, the "overheating" of the flue gas at the filter layer should be no greater than 5° C., i.e. the temperature of the flue gas should not exceed the water dewpoint at the filter by more than 5° C.

OBJECTS OF THE INVENTION

It is the principal object of the present invention to provide an improved method of desulfurizing a flue gas from a coal-fired combustion process whereby the disadvantages of prior art systems are avoided.

Another object of this invention is to increase the efficiency of sulfur removal from such flue gases so that the sulfur binding effect of the dry additive technique can be increased without creating the danger of incrustation and corrosion.

Still another object of the invention is to provide an improved apparatus for desulfurizing flue gases.

SUMMARY OF THE INVENTION

These objects and others which will become more readily apparent hereinafter are attained, in accordance with the invention, in a method in which the further cooling of the flue gas before it reaches the filter and after it has been discharged from the furnace, is effective by adding to the flue gas stream before it enters the dust filter, a temperature-reducing quantity of coal additive ash, this quantity of proportion being such that the flue gas temperature is reduced to the neighborhood of the water dewpoint. This markedly increases the degree of binding of the sulfur to the additive.

According to a further feature of the invention, the supplied additive ash is recovered from the flue gas stream, cooled and recycled to the flue gas stream as the additional agent. Most preferably, the flue gas before the cold additive is fed into it, is preliminarily cooled to a temperature above the water dewpoint, thereby increasing the relative humidity, the cold additive ash being thereupon supplied to reduce the temperature still further to the water dewpoint.

In an embodiment of the invention, the additive ash laden hot flue gas is divided into two partial streams, one of which is cooled and then reacted with the previously cooled additive ash in the manner previously described. This partial stream, after traversing the dust filter and being freed from its sulfur content, is combined with the second partial stream which in hot form is passed through the dust filter without cooling and without the addition of additive ash so that it remains at an elevated temperature and, upon admixture to the cleaned first partial stream, brings the combined stream to a temperature which is sufficient to allow it to be discharged into the atmosphere through a stack, i.e. a temperature sufficient to permit stack operation.

In another embodiment of the invention, the additive ash laden hot flue gas is cooled to a temperature above the water dewpoint and then the cold additive ash is added to it and after removal of the additive ash in the dust filter, the cleaned gas is reheated so that it can be discharged through the stack.

According to still another feature of the invention, the additive ash laden hot flue gas is separated from the additive ash in a filter and the resulting product is divided into two partial gas streams. One of these gas streams is cooled, reacted with cold additive ash and filtered in a further dust filter while the other partial gas stream without cooling is passed through a dust filter and then the two streams are mixed to provide a combined stream capable of being discharged through the stack.

The apparatus for carrying out the present invention is thus provided with a dust filter in the flue gas stream or in a portion thereof, e.g. in one of the partial stream and upstream of the filter with a cooler and means for introducing cooled additive ash to the stream or portion thereof to be cooled. An ash cooler for cooling the additive ash from this or another filter upward or downstream therefrom can also be provided.

The cooling effected according to the invention to the dewpoint, because it involves the addition of a cold solid, does not lead directly to the formation of free water of condensation on the walls of the apparatus and any condensation appears to take place exclusively on the surfaces of the additive ash which thus functions not only as the cooling agent but as a nucleating agent.

Since the water forms a film on the surface which promotes the following reaction:

and which in turn leads to the reaction:

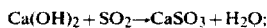

the sulfur trapping is obviously promoted.

The cooling of the flue gas is carried out initially as much as possible using the conventional techniques with regenerative use of the recovered heat.

BRIEF DESCRIPTION OF THE DRAWING

The above and other objects, features and advantages will become more readily apparent from the following description, reference being made to the accompanying drawing in which.

SPECIFIC DESCRIPTION

Figure 1:
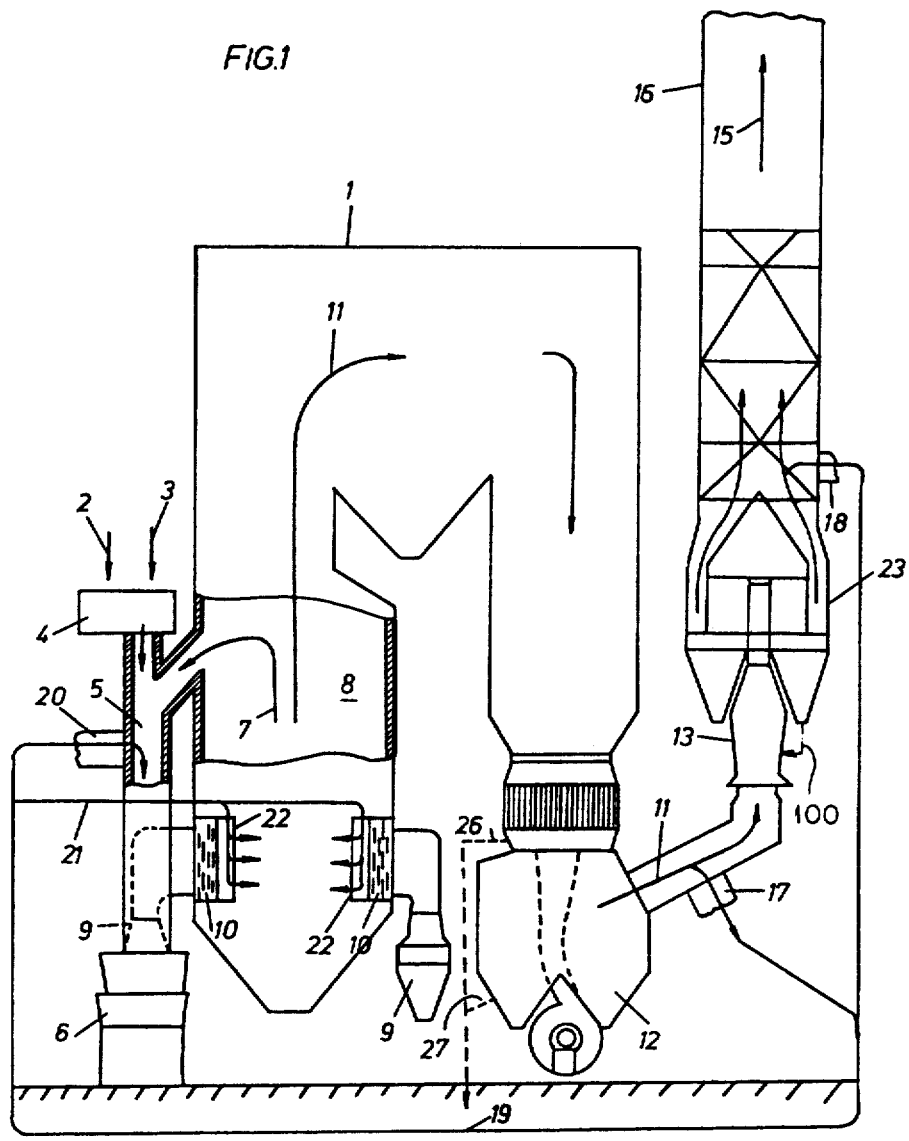
FIG. 1 is a diagrammatic elevational view illustrating a boiler installation provided with a coal fired combustion chamber and with cold gas recycling according to the present invention.

The steam boiler shown in FIG. 1 for the combustion of coal which is burned by the dry additive process to produce steam, e.g. for driving steam turbines in a power plant, proportions the low rank (brown) coal 2 and the lime additive 3, (e.g. calcium carbonate) via suitable conveyor means to a distributor or feeder 4 which introduces them via a free-fall shaft 6 into the coal mill 6. The carrier gas is a portion of the hot flue gas represented at 7 from the combustion chamber 8 which is conducted through the shaft 5 and therefore through the mill 6.

In the coal mill 6, the coal is ground to the desired particle size, is thoroughly dried by the hot flue gas, and is blended with the lime which forms the sulfur binding agent.

The dust-like combustion mixture is pneumatically drawn through a sifter or pneumatic grading device 9 into the coal dust burner 10 and then blown into the fire box 8 in which the coal is burned in the presence of air to yield a flue gas and ash.

A small portion of the flue gas thus formed is, in the manner described, recycled through the mill-drying apparatus 5, 6. The remainder of the flue gas 11 is discharged from the fire box transferring its heat to heating surfaces and tube loops not shown as it passes through an ash separator 12, the flue gas being displaced by a suction draft blower 13. The flue gas is then passed through a dust filter 23 and is discharged as cleaned gas 15 before it is released into the atmosphere.

Thus sharply cooled flue gas at a temperature of about 150° C. can be selectively removed at the points 17, 18, 26 or 27 and returned via line 19 (alternatively or simultaneously or in any combination) via two paths to the combustion chamber 8.

One such path includes a fitting 20 opening into the shaft 5 whereby the cool gas is mixed with the hot flue gas traversing the mill drying stage 5, 6 and then passing via the sifter 9 and the coal dust burner 10 into the firebox 8. The second path utilizes the duct 21 which opens into cold gas inlet slits 22 by means of which the cold gas is directly injected into the combustion chamber 8.

Upon recovery of the cold gas at the locations 26, 27, and 17, the recycled coal gas is laden with ash particles at least in part consisting of unreacted additive which is thereby returned to the fire box. It is conventional, in this regard, to provide a stoichiometric excess of the additive in relation to the coal. When the cold gas is recovered at 18, it is recycled as a clean gas.

Figure 2:
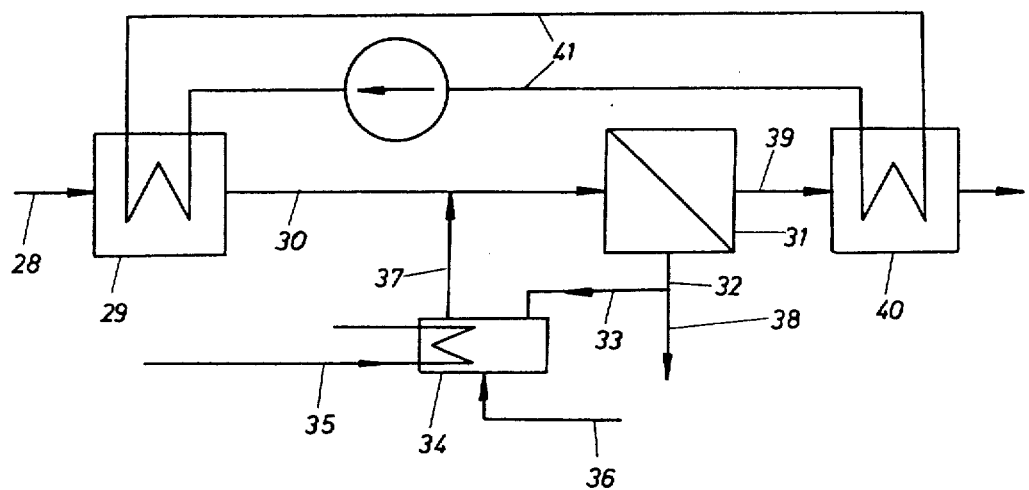
FIG. 2 is a flow diagram of the system of the invention in which the cold additive ash is added to the entire quantity of the flue gas before filtering.
Figure 3:
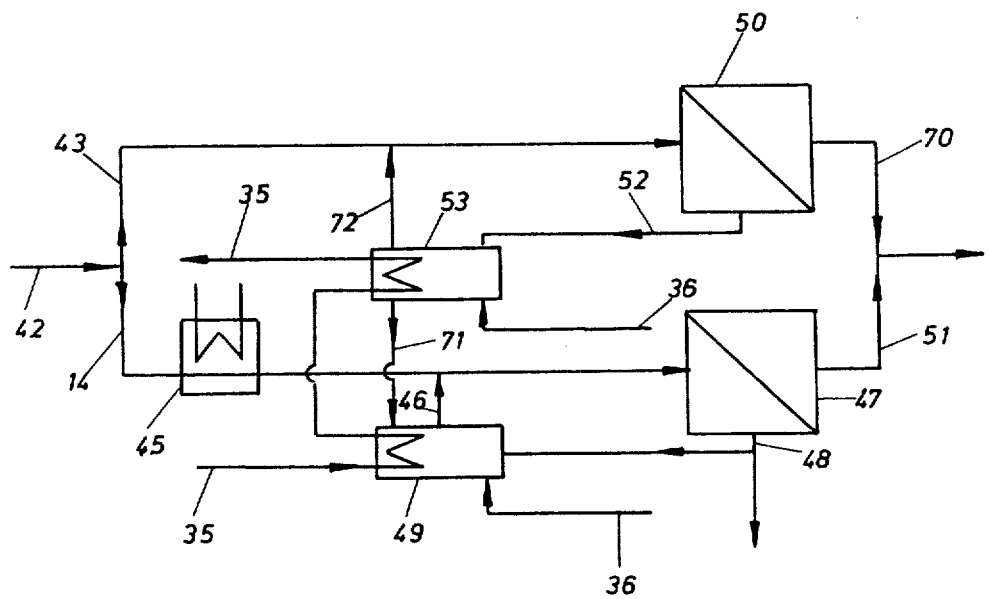
FIG. 3 is a view similar to FIG. 2 of an embodiment in which additive ash is supplied to two partial streams from separate ash coolers.
Figure 4:
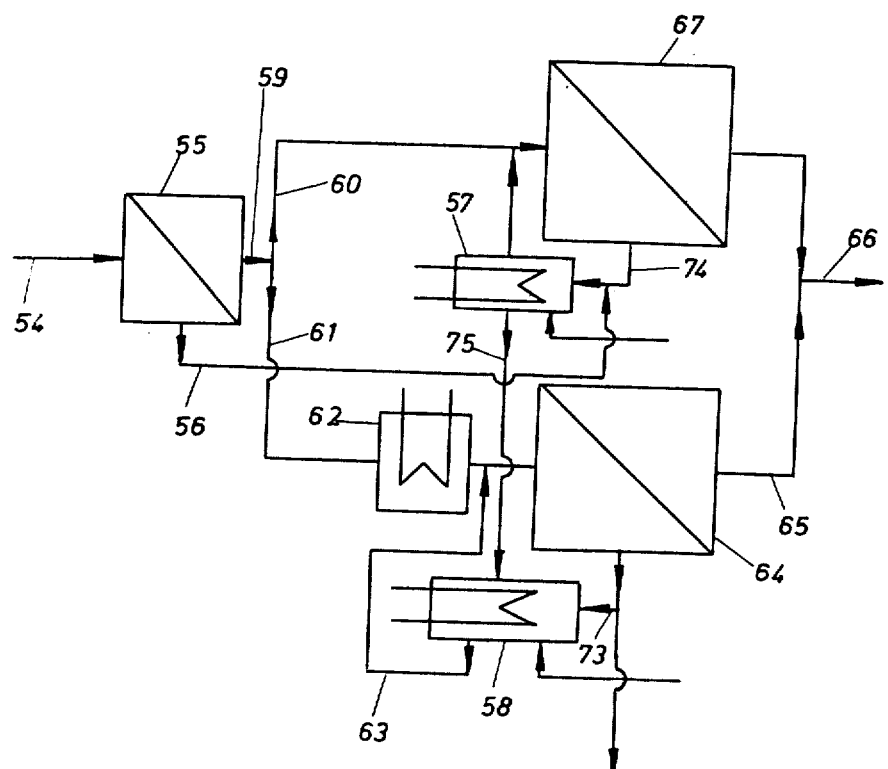
FIG. 4 is a flow diagram illustrating still another embodiment of the present invention.

To this extent, the apparatus illustrated in FIG. 1 represents the dry additive process and it may also be noted that upstream of the filter 23, according to the invention, unconsumed additive can be supplied as generally represented by the dot dash line 100 but also shown in greater detail in FIGS. 2 through 4.

FIG. 2 shows a first embodiment of the invention in which the raw gas 28 at relatively high temperature and charged with the additive ash from the boiler or fire box or from the ash separator 12 (see FIG. 1) traverses the contact cooler 29 in which the raw gas in a conventional manner is cooled to a temperature above the water dewpoint of the flue gases. The raw gas 30, thus preliminary cooled, is fed to the dust filter 31 which can correspond to the dust filter 23 in FIG. 1. The dust filter may be a cloth-tube or cloth-bag filter.

The ash recovered in the filter 31 is at least partly cooled in an ash cooler 34 sharply. This ash cooler 34 can be a fluidized bed cooler in which the cooling medium is represented at 35 and the fluidizing air is introduced at 36.

The cooled ash, entrained in the fluidizing air, is returned at 37 to the flue gas stream 30. Shortly before the flue gas enters the filter 31, therefore, the temperature of the flue gas stream and its additive ash is sharply reduced to promote the reactions described with binding of sulfur. A portion of the recovered additive ash with bound sulfur is discharged at 38.

The clean gas 39 can be reheated in a heat exchanger 40 to a temperature enabling it to be discharged through a stack into the atmosphere. The cooler 29 is coupled to the heater 40 via the heat transfer medium which is circulated over a path 41 to permit best utilization of the thermal energy.

The embodiment shown in FIG. 2 has the advantage that practically complete desulfurization is obtained since all of the flue gas is treated with the recycled additive ash. The approach however has the disadvantage that additional energy may be required for the reheating of the clean gas.

A compromise between energy recovery and desulfurization is also apparent in the embodiment of FIG. 3. Here the raw gas 42 is divided into two partial streams 43, 44. The partial stream 44 is treated in a manner similar to that shown in FIG. 2. After preliminary cooling the cooler 45 and mixing with cooled ash at 46, this partial stream 44 is introduced into the dust filter 47 which separates the ash 48 from the gas stream and permits the ash to be cooled at 49 and returned to the partial gas stream at 46 in the manner described. The cold clean gas 51 is delivered to the stack.

At 35 we have shown the flow of the cooling medium while 36 represents the fluidizing air. The other partial stream 43 is supplied in a hot state to the filter 50 and the hot clean gas can be mixed with the cold clean gas from line 51 before entering the stack, thereby insuring that the gas mixture will have the requisite temperature for effective stack operation.

In general it is advantageous to recycle at least some of the ash at 52 through a cooler 53 and to the gas stream at 72. This is especially effective when the partial stream 43 is small by comparison to the partial stream 44.

The heat recovered by the coolers 49 and 53 can be used as process energy, e.g. to preheat the combustion air for the boiler. Line 72 can also deliver waste air from the cooler 52 when the cooled particulates of this cooler are delivered at line 71 to the cooler 49. In this case, cooler 53 can represent a preliminary cooler for the cold ash returned at 46 to the partial gas stream at 44.

In this embodiment, the partial gas stream 43 is subjected to minimum or no desulfurization before it enters the filter 50 although this embodiment is highly effective on energetic grounds.

The subdivision of the flue gas stream 42 into the partial gas streams 43 and 44 can be effected in a proportion such that no additional heating is necessary for the gas delivered to the stack.

The following specific example applies:

raw gas temperature $= 150°$ C.;

required temperature of the clean gas in the stack $= 90°$ C.;

temperature of the cold clean gas $51 = 60°$ C.;

$90 = 150x + 60 (1 - x)$.

Solving for x one obtains $x = \frac{1}{5}$. Consequently, the volume ratio of the partial stream 43 to the partial stream 44 must be $\frac{1}{5}:\frac{4}{5}$.

FIG. 4 shows a further embodiment of the system of the invention. Here the raw gas 54 is entirely subjected to filtration in a preliminary filter 55 and the resulting ash is recovered at 56 and cooled in two coolers 57 and 58. The hot gas 59 is then divided into two partial streams 60 and 61. The partial stream 61 is cooled in cooler 62 and the cold ash 63 from cooler 58 is introduced into the partial stream 61. In the dust filter 64, the ash is recovered and via line 73 at least partly returned to the cooler 58. The cold clean gas stream 58, after being mixed with the hot partial gas stream 60 is discharged through the chimney as clean gas 66. The second partial stream 60, in its heated state, is passed through a filter 67 and the recovered ash 74 is delivered to the cooler 57 together with the ash 56 from the preliminary filter 55. The return of ash at 74 can also be eliminated if this ash is generated in small quantities. The combination of the hot and cold streams is such that the gas delivered to the stack does not require further heating. The precooled ash from cooler 57 is passed via line 75 into the cooler 68 and is then recycled at 63 to the partial stream 61.

We claim:

1. A method of desulfurizing a raw gas generated by the combustion of coal in a combustion chamber, said method comprising in combination:

(a) introducing into said combustion chamber a solid sulfur-binding additive adapted to form an additive ash which is entrained in said raw gas;

(b) cooling a quantity of additive ash previously recovered from a flue gas and formed by reaction in a coal-fired combustion chamber to form a cold additive ash;

(c) cooling at least a portion of said raw gas to reduce the temperature thereof to a temperature level above a water dewpoint thereof at which water spontaneously condenses with lowering of temperature;

(d) filtering at least said portion of said raw gas cooled in step (c) to recover additive ash therefrom, thereby forming a clean gas;

(e) discharging said clean gas; and (f) further cooling at least said portion of said raw gas to substantially said dewpoint following step (c) and prior to step (d) by adding to it said portion of the additive ash cooled in step (b).

2. The method defined in claim 1 wherein the additive ash cooled in step (b) is additive ash filtered from raw gas in step (d) and then cooled in step (b) and returned to cool additional quantities of raw gas in step (f).

3. A method of desulfurizing a raw gas generated by the combustion of coal in a combustion chamber, said method comprising in combination:
  (a) introducing into said combustion chamber a solid sulfur-binding additive adapted to form an additive ash which is entrained in said raw gas;
  (b) cooling a quantity of additive ash previously recovered from a flue gas and formed by reaction in a coal-fired combustion chamber to form a cold additive ash;
  (c) cooling at least a portion of said raw gas to reduce the temperature thereof to a temperature level above a water dewpoint thereof at which water spontaneously condenses with lowering of temperature;
  (d) filtering at least said portion of said raw gas cooled in step (c) to recover additive ash therefrom, thereby forming a clean gas;
  (e) discharging said clean gas; and
  (f) further cooling at least said portion of said raw gas to substantially said dewpoint following step (c) and prior to step (d) by adding to it said portion of the additive ash cooled in step (b), said raw gas being divided into two partial streams, a first of said partial streams subjected to steps (d), (e) and (f), the second of said partial streams being subjected to hot filtration to reduce a hot gas which is mixed with said clean gas prior to the discharge thereof so that the resulting mixture has a temperature enabling discharge thereof through a stack.

4. The method defined in claim 3 wherein additive ash recovered by filtering said second stream is cooled in step (b) together with additive ash recovered by step (d) from said first stream.

5. The method defined in claim 1, further comprising the step (g) of heating said clean gas and discharging same through a stack.

6. The method defined in claim 1, further comprising the step of preliminarily filtering said raw gas prior to the cooling thereof in step (c).

7. A method of desulfurizing a raw gas generated by the combustion of coal in a combustion chamber, said method comprising in combination:
  (a) introducing into said combustion chamber a solid sulfur-binding additive adapted to form an additive ash which is entrained in said raw gas;
  (b) cooling a quantity of additive ash previously recovered from a flue gas and formed by reaction in a coal-fired combustion chamber to form a cold additive ash;
  (c) cooling at least a portion of said raw gas to reduce the temperature thereof to a temperature level above a water dewpoint thereof at which water spontaneously condenses with lowering of temperature;
  (d) filtering at least said portion of said raw gas cooled in step (c) to recover additive ash therefrom, thereby forming a clean gas;
  (e) discharging said clean gas; and
  (f) further cooling at least said portion of said raw gas to substantially said dewpoint following step (c) and prior to step (d) by adding to it said portion of the additive ash cooled in step (b);
  (g) preliminarily filtering said raw gas prior to the cooling thereof in step (c); and
  (h) dividing the raw gas after the preliminary filtering thereof into a first stream which is subjected to steps (c), (d), (e) and (f) and a second stream which is filtered hot to form a hot gas, said hot gas being combined with said clean gas prior to the discharge thereof to form a gas mixture at a temperature enabling the discharge thereof through a stack.

8. The method defined in claim 7 wherein additive ash recovered by filtering said second stream is cooled together with additive ash recovered from the filtration of said first stream to form the additive ash which is cooled in step (b).

9. A method of desulfurizing a raw gas generated by the combustion of coal in a combustion chamber, said method comprising in combination:
  (a) introducing into said combustion chamber a solid sulfur-binding additive adapted to form an additive ash which is entrained in said raw gas;
  (b) cooling a quantity of additive ash previously recovered from a flue gas and formed by reaction in a coal-fired combustion chamber to form a cold additive ash;
  (c) filtering at least a portion of said raw gas to recover additive ash therefrom thereby forming a clean gas;
  (d) discharging said clean gas; and
  (e) further cooling at least said portion of said raw gas to substantially its water dewpoint prior to step (c) by adding to said portion of the cooled raw gas at least a portion of the additive ash cooled in step (b).

10. An apparatus for the desulfurization of a raw gas generated by the combustion of coal in a combustion chamber comprising in combination:
  means for introducing into said combustion chamber a solid sulfur-additive adapted to form an additive ash which is entrained in said raw gas;
  means for cooling a quantity of additive ash recovered from a flue gas and formed by reaction in a coal-fired combustion chamber to produce a cold additive ash;
  means for cooling at least a portion of said raw gas to reduce the temperature thereof to a temperature level above water dewpoint thereof at which water spontaneously condenses with lowering of temperature;
  means for filtering at least said portion of said raw gas following the cooling thereof to recover additive ash therefrom thereby forming a clean gas;
  means for exchanging said clean gas; and
  means for adding at least to said portion of the cool raw gas at least a portion of the cooled additive ash for further cooling said portion of said raw gas to a temperature of substantially said dewpoint.

11. The apparatus defined in claim 10, further comprising means for dividing said raw gas into two streams one of which forms said portion and another of which is subjected to hot filtration, means being provided for combining the hot filtered gas with the clean gas for discharge through a stack.

12. An apparatus for the desulfurization of a raw gas generated by the combustion of coal in a combustion chamber comprising in combination:
  means for introducing into said combustion chamber a solid sulfur-additive adapted to form an additive ash which is entrained in said raw gas;

means for cooling a quantity of additive ash recovered from a flue gas and formed by reaction in a coal-fired combustion chamber to produce a cold additive ash;

means for cooling at least a portion of said raw gas to reduce the temperature thereof to a temperature level above water dewpoint thereof at which water spontaneously condenses with lowering of temperature;

means for filtering at least said portion of said raw gas following the cooling thereof to recover additive ash therefrom thereby forming a clean gas;

means for exchanging said clean gas;

means for adding at least to said portion of the cooled raw gas at least a portion of the cooled additive ash for further cooling said portion of said raw gas to a temperature of substantially said dewpoint;

a preliminary filter for removing additive ash from said raw gas;

means for dividing the raw gas downstream of said preliminary filter into two partial streams, one of said partial streams forming said portion;

means for hot filtering the other of said partial streams to form a hot gas; and means for mixing said hot gas with said clean gas to form a gas mixture at a relative temperature for discharge through a stack.

13. The apparatus defined in claim 10 wherein the means for cooling said additive ash is a fluidized bed receiving additive ash from a filter whereby a fluidizing gas entrains cooled additive ash into said portion of said raw gas.

* * * * *